May 17, 1932.  V. HEIDELBERG  1,858,824
METHOD AND HIGH COMPRESSION INTERNAL COMBUSTION
ENGINE FOR WORKING WITH GAS AND LIQUID FUEL
Filed July 30, 1929  3 Sheets-Sheet 1

INVENTOR:
VICTOR HEIDELBERG.
BY
ATTYS.

May 17, 1932. V. HEIDELBERG 1,858,824
METHOD AND HIGH COMPRESSION INTERNAL COMBUSTION
ENGINE FOR WORKING WITH GAS AND LIQUID FUEL
Filed July 30, 1929 3 Sheets-Sheet 2

INVENTOR:
VICTOR HEIDELBERG.
BY
ATTYS.

May 17, 1932.  V. HEIDELBERG  1,858,824
METHOD AND HIGH COMPRESSION INTERNAL COMBUSTION
ENGINE FOR WORKING WITH GAS AND LIQUID FUEL
Filed July 30, 1929  3 Sheets-Sheet 3

INVENTOR:
VICTOR HEIDELBERG.
BY
ATT'YS.

Patented May 17, 1932

1,858,824

UNITED STATES PATENT OFFICE

VICTOR HEIDELBERG, OF BENSBERG, NEAR COLOGNE, GERMANY, ASSIGNOR TO MOTORENFABRIK DEUTZ, AKTIENGESELLSCHAFT, OF COLOGNE-DEUTZ, GERMANY

METHOD AND HIGH COMPRESSION INTERNAL COMBUSTION ENGINE FOR WORKING WITH GAS AND LIQUID FUEL

Application filed July 30, 1929. Serial No. 382,109.

The present invention relates to high compression internal combustion engines and to methods of operating the same, and more particularly to such engines and methods when the engine is adapted to operate on gaseous and liquid fuels.

As an example of the invention, but without limitation thereto, a mixture of a low grade gas, not exceeding 1200 kcl. calorific power with a normal surplus of air, or a mixture of a richer gas and a correspondingly greater surplus of air, is brought to a final degree of compression of less than 32 atms., and into this charge a quantity of oil is airlessly injected, said oil being preferably as perfectly atomized as possible, and the quantity of oil thus injected being a little less than the quantity necessary to inject in order to operate an engine running idle with oil only. Tests have proven that a charge of such a gas and air mixture, at the above mentioned degrees of compression, will not produce spontaneous ignition by observing certain precautions, for example, if the engine be properly cooled and the presence of such projecting parts as might produce local superheating is avoided. Furthermore, it has been found that gas mixtures which burn irregularly, that is to say too violently or too slowly, when ignited by spontaneous ignition, (hot tube ignition or electrical ignition, for example) show a perfect and regular ignition in the presence of the most favorable pressure (highest combustion pressure not more than 40 atms.) when ignited by the injection of a charge of oil which is not quite sufficient for idle running of the engine.

In accordance with the method of the present invention these difficulties are avoided. The present invention has among its advantages that it avoids the use of spark plugs for highly compressed mixtures and avoids the disadvantages incident to the use of ignition devices which present parts projecting into the engine cylinder likely to cause premature ignition. Spark plugs do not work satisfactorily at the herein contemplated pressures, and the nozzle of the fuel injection valve, which in a sense replaces the ignition device (for example, the spark plug or hot tube), may be readily formed without projecting parts, and is cooled by the substantially continuous flow of liquid fuel to such a degree as to avoid premature ignition.

Preferably the quantity of ignition oil injected be less than the quantity necessary for idle running of the engine. If this limit be exceeded, violent ignition is liable to take place with the consequent danger of an overcharging of the engine. The same drawback may exist if too rich gas be used. If the proportions be properly chosen, the method of the present invention will give a graph showing nearly the same relative efficiency as that of a Diesel engine, as ordinarily operated, which means an engine of which the stress and the efficiency is almost the same as that of such a Diesel engine.

In order to secure the greatest economy the governing of the engine is preferably effected by varying the quantity of gas fuel while the quantity of the injected fuel remains constant. For this purpose the governor may be designed to prevent the quantity of oil injected from exceeding that necessary for idle running by wedge members or other suitable means. Rather low grade charges also which gas will not ignite or which burn only slowly when ignited in the usual manner by spark plugs or by breaking contact will be caused to burn quickly and completely by the burning jet of oil and with a perfect heat utilization.

Thus the operation of a gas engine with additional means for the injection of fuel allows the engine to be driven chiefly on gas, injecting a small quantity of the liquid fuel for accurate ignition, or on liquid fuel exclusively. In the first case the engine governor preferably regulates only the means for admitting the gas while the charge of liquid fuel preferably is reduced to an amount smaller than necessary for idling on fuel only. In the second case the engine governor exclusively acts on the organs for supplying the liquid fuel and the admission of gas is completely interrupted.

Where gases of variable heating efficiency are made use of, thus requiring the further control of the gas by hand, the governor itself provides the necessary adaptation simultaneously to the required efficiency and calorific power.

The present method and treatment are of the greatest advantage when applied to internal combustion engines used in connection with oil wells.

The aims and objects of the invention will be clearly understood from the following description taken in connection with the accompanying drawings of an illustrative engine for carrying out the invention, the real scope of the invention being more particularly pointed out in the appended claims.

Figure 1:
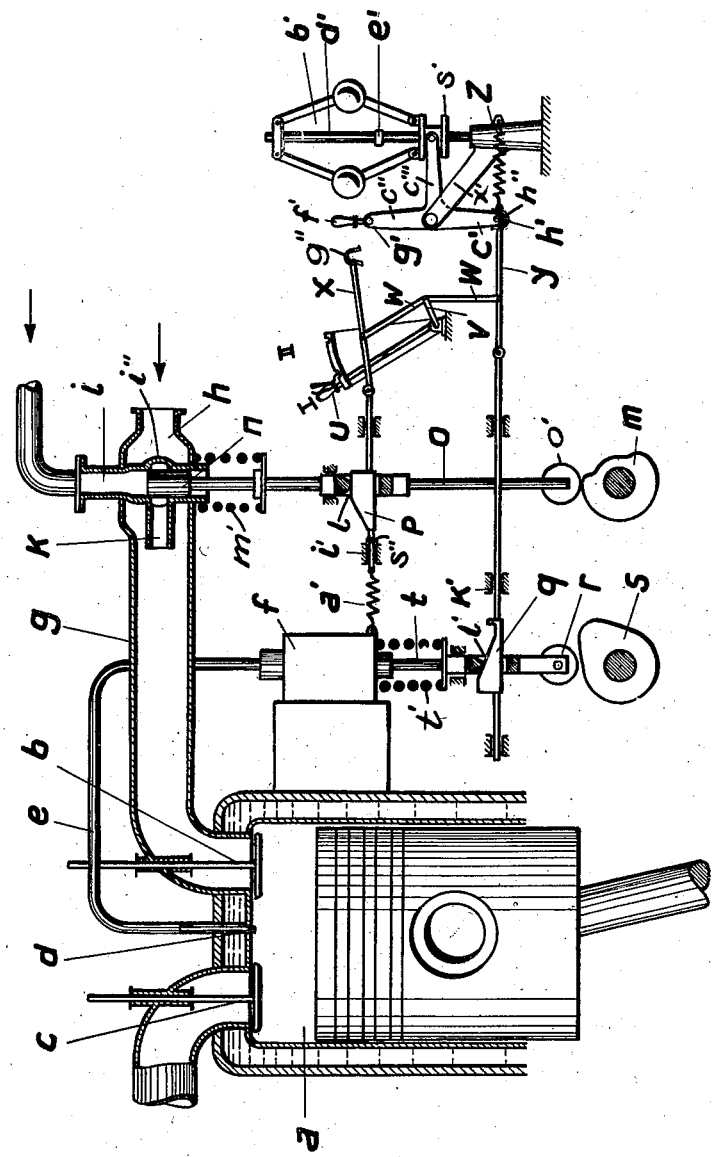
Figure 1 shows partly in section those parts of a Diesel engine necessary to the understanding of the invention, the governor being shown connected to the oil fuel pump and disconnected from the gas controlling means.

In the drawings an illustrative embodiment of the invention is shown in a Diesel engine, for the sake of simplicity only those parts being illustrated that are essential to the understanding of the invention. The engine $a$ is provided as usual with intake and exhaust valves $b$ and $c$ respectively. The oil fuel injection nozzle $d$ is connected by a pipe $e$ with the oil fuel pump $f$. It will be noted that the injection nozzle is practically flush with the inner wall of the cylinder head so that there is no projecting part that might cause premature ignition by overheating. The intake pipe $g$ is connected to the intake valve $b$, the air for combustion being sucked in through the port $h$. The gas fuel is supplied through the supply pipe $i$ and flows through a housing $i''$ and pipe $k$ into the intake pipe $g$ where it mixes with the air drawn in through the port $h$. In the housing $i''$ there is provided means for controlling the gas fuel supply, said means herein consisting of a slide valve member $n$ which has a sliding fit in the housing $i''$.

The gas fuel supply controlling slide valve $n$ is timed in its movement so as to open simultaneously with the intake valve $b$. It is moved by the cam $m$ through the push rod $o$ against the action of a spring $m'$. The push rod $o$ is provided with a slot $l$ in which a wedge $p$ supported upon a fixed support is adapted to slide. This wedge is moved by the governor $b'$ as more fully described below. When said wedge is in its extreme position to the right, the cam roll $o'$ of the push rod $o$ can contact readily with the lowest part of the cam $m$ so that the slide valve can open to the fullest extent. The further the wedge $p$ is moved to the left however, the sooner will the upper wall of the slot $l$ in the push rod $o$ contact with the operative surface of the wedge $p$, until, in the extreme left position of said wedge, the slide valve $n$ will be maintained in its highest position and cannot open at all.

The control of the liquid fuel pump is effected in well known manner by movement of a wedge $q$ whereby the stroke of the liquid fuel pump is varied. This wedge $q$ is so shaped and arranged that in its extreme left position the cam roll $r$ on the lower end of the liquid fuel pump plunger rod $t$ can contact with the lowest part of the cam $s$ by which the plunger is operated so that in this position of the wedge the full stroke of the cam $s$ is utilized. When however, the wedge $q$ is in its extreme right position the rod $t$ will be raised against the action of the spring $t'$ to such an extent that the effective stroke of the cam is very small with a consequent short stroke of the pump plunger $t$. In the illustrative embodiment of the invention the length of this short stroke is such that the quantity of oil that is fed by this stroke will surely suffice to ignite the gas mixture in the cylinder but is less than the amount of oil used by the engine when running idle in the Diesel cycle.

In accordance with the invention means are provided for connecting the governor only with the gas slide valve $n$ when the machine is to be operated by gas, and on the other hand for connecting the governor only with the liquid fuel pump when the engine is to be operated with oil only. Any suitable means may be provided in accordance with the invention for this purpose but in the illustrative embodiment of the invention herein shown said means conveniently comprises a hand lever $u$ fulcrumed at its lower end to a fixed support and adapted to be locked in either one of two positions I and II by a pawl, for example. To the lower end of the lever $u$ is rigidly secured one end of a lever $v$, the other end of which is pivoted to one end of two rods $w, w$. The other ends of the rods $w, w$ are pivoted respectively to rods $x$ and $y$, the former connected to and operating the wedge $p$ and the other connected to and operating the wedge $q$, which slides in a slot $l'$ in the rod $t$ similar to the slot $l$ in the rod $o$. To a fixed arm $x'$ is fulcrumed a three armed lever, the arms $c'$ and $c''$ of which are each provided at its end with a stud $g'$ and $h'$ respectively adapted to be engaged respectively by latches $h''$ and $g''$ on the ends of rods $y$ and $x$. The third arm $c'''$ of said three armed lever has a forked end pivoted to the sleeve $s'$ of the governor $b'$. A stop $e'$ is provided on the governor spindle $d'$ to limit the upward movement of said sleeve and the arm $c''$ of the three armed lever is conveniently provided with a handle $f'$. A spring $z$, secured at one end to the governor standard and at its other end to the right extremity of the rod $y$, tends to draw the wedge $q$ to the right, and a similar spring $a'$, secured at one end to the casing of the liquid fuel pump $f$ and at its opposite end to the left extremity of the rod $x$ tends to draw the wedge $p$ to the left. The rod $x$ is provided with a stop $s''$ which abuts against a fixed stop $i'$ when the wedge $p$ reaches its extreme left position, thus completely cutting off the gas supply.

In Figure 1 the hand lever $u$ is in the position I. In this position the action of the lever $v$ and rods $w, w$ are such that the rod $x$ is lifted so high that its latch $g''$ is out of engagement with the stud $g'$ of the arm $c''$ of the three armed lever. On the other hand the rod $y$ is lifted into a position in which its latch $h''$ can engage the stud $h'$ on the arm $c'$ of the three armed lever so that the engine will be operated by oil and this operation is under control of the governor $b'$.

Figure 2:
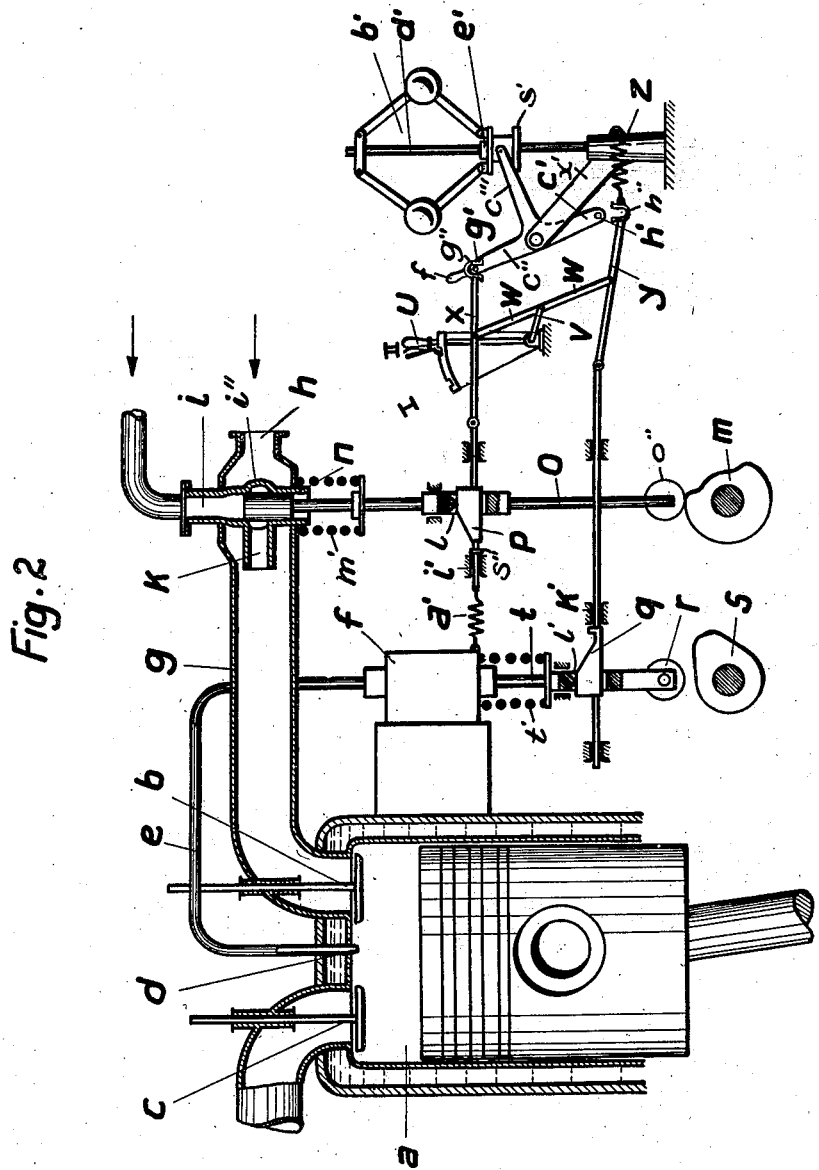
Fig. 2 shows the same parts as in Figure 1, also partly in section, but with the parts in the position of being changed from oil operation to gas operation.
Figure 3:
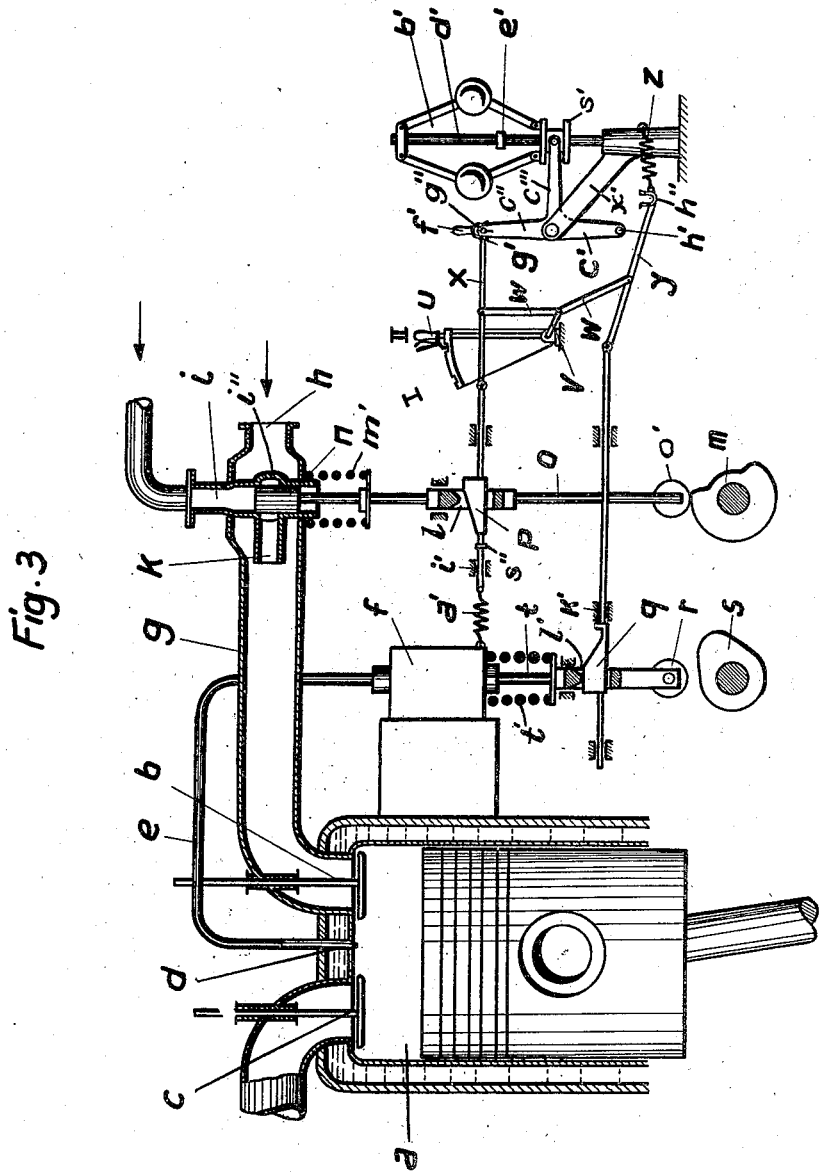
Fig. 3 shows the same parts as in Figures 1 and 2, also partly in section, but after the change from oil to gas operation has been made so that the governor is disconnected from the oil fuel pump and is connected with the gas controlling means.

When it is desired to change the machine for gas operation the three armed lever will be moved first into the position shown in Fig. 2, and the hand lever $u$ is then also moved into the position II shown in said figure. This lowers the rod $x$ so that its latch $g''$ engages the stud $g'$ on the arm $c''$ of the three armed lever, while the rod $y$ is lowered so that its latch $h''$ is disengaged from the stud $h'$ on the arm $c'$ of the three armed lever. If the handle $f'$ of the three armed lever be now released, the governor can control the gas operation of the machine. This is clearly shown in Fig. 3. Therein the governor operates the wedge $p$, thereby controlling the gas fuel valve and gas supply, while the spring $z$ is free to draw the wedge $q$ into its furthest position to the right, wherein the stroke of the oil pump is so small that the amount of oil injected into the cylinder is only sufficient to effect the ignition of the gas charge in the cylinder.

It will be seen that in accordance with the present invention a Diesel engine may be run alternatively either with oil or with gas and that either operation may be controlled by a governor. This is a great advantage and of importance in securing a sure and uninterrupted operation of the machine should there be a sudden failure in the gas supply when the machine is being operated by gas. This occurs not infrequently when engines are being driven by natural gas, for it is well known that at times the supply of such gas is abundant whereas at other times the supply is so low that it is not sufficient for the load on the engine. In such case the present invention enables the operation of the machine to be continued with practically no interruption by shifting over to the oil operation. For this purpose it is only necessary to interrupt the connection between the gas controlling means and the governor and connect the oil fuel pump with said governor, in the manner already described.

Furthermore, it will be seen that in accordance with the present invention when the engine is to be gas operated there is injected into the cylinder a quantity of oil fuel which is sufficient for the sure starting of the ignition but is less than the quantity of oil fuel that would be required to secure the idle running of the engine in the pure Diesel operation, the quantity of oil fuel thus injected remaining constant throughout the entire range of the load upon the engine, the quantity of fuel to be supplied being regulated to the load by varying the gas supply only. This offers several important advantages. A gas fuel, and particularly producer gas is materially cheaper than oil that is used for ignition, it will be seen that in accordance with the present invention only the least amount required of the more expensive fuel is used; this represents the greatest economy for this mode of operation. The amount of oil fuel injected being less than that required for the idle drive in the Diesel operation, the oil pump need not be subjected to the control of a governor; the latter on the contrary controls only the gas supply in the manner usual in engines operated wholly by gas, but in such manner that the relatively small amount of gas introduced into the engine when the latter is running idle and the constant quantity of oil injected just meets the consumption of the machine under these circumstances. In this way a separate control of the oil pump is avoided without endangering the sure operation of the engine.

It will be understood that wide deviations may be made from the embodiments of the invention herein described without departing from the spirit of said invention.

I claim:

1. The method of operating a Diesel engine, which comprises compressing in the engine cylinder a mixture of air and fuel to a temperature less than its igniting point; igniting said compressed mixture by injecting into it a liquid fuel having an igniting point less than said temperature due to compression; and varying the richness of said air and fuel mixture in proportion to the load on said engine, while under all loads maintaining the amount of said liquid fuel injected constant and less than that necessary to operate the engine under no load or idle conditions.

2. Diesel engine adapted to operate with a compression which, when operating with a gas and air mixture is not sufficient to ignite said mixture, but is sufficient to ignite a quantity of oil injected near the end of the compression, comprising in combination, an oil fuel pump; adjusting means therefor to adjust the feed of said pump to inject the lowest amount that will suffice to ignite the gas and air mixture in the cylinder but which is not sufficient for the idle operation of the engine without the addition of gas; gas feed controlling means; a governor; and operative connections between said governor and said gas feed controlling means.

3. Diesel engine adapted to operate with a compression which, when operating with a gas and air mixture is not sufficient to ignite said mixture, but is sufficient to ignite a quantity of oil injected near the end of the compression, comprising in combination, an oil fuel pump; adjusting means therefor to adjust the feed of said pump to inject the lowest amount that will suffice to ignite the gas and air mixture in the cylinder but which is not sufficient for the idle operation of the engine without the addition of gas; gas feed controlling means; a governor; operative connections between said governor and said oil fuel pump; connections between said governor and said gas feed controlling means; and means for disconnecting the gas feed controlling means from said governor and connecting the oil fuel pump to said governor.

4. In a Diesel engine in combination, a cylinder; an intake and an exhaust valve therefor; air intake means communicating with said intake valve; gas feeding means to feed gas to said air intake means for admixture with the air in said air intake means; liquid fuel injecting means to inject liquid fuel into said cylinder; means for varying the amount of gas fed to said air intake means; means for varying the amount of liquid fuel injected into said cylinder; a governor; connecting means intermediate said governor and said gas feed varying means; connecting means intermediate said governor and said liquid fuel injection varying means; and manually controlled means for rendering one of said connecting means operative and the other inoperative alternatively to operate said engine with gas or liquid fuel under control of said governor.

5. The method of operating a Diesel engine which comprises supplying the cylinder of said engine with a combustible mixture, controlling said mixture under varying loads for controlling the engine speed, compressing said mixture at all loads to a temperature below the ignition temperature of said mixture, and igniting said mixture by injecting into said cylinder an auxiliary fuel having an ignition point less than the temperature of compression of said mixture, the amount of said auxiliary fuel injected under all load conditions being insufficient to operate the engine.

6. The method of operating a Diesel engine which comprises supplying the cylinder of said engine with a combustible mixture, controlling the richness of said mixture under varying loads for controlling the engine speed, compressing said mixture at all loads to a temperature below the ignition temperature of said mixture, and igniting said mixture by injecting into said cylinder an auxiliary fuel having an ignition point less than the temperature of compression of said mixture.

7. The method of operating a Diesel engine which comprises supplying the cylinder of said engine with a comparatively lean mixture of gas and air, compressing said mixture in said cylinder on the compression stroke of said engine to a temperature less than the ignition temperature of said mixture, igniting the compressed mixture by injecting into said cylinder a relatively small charge of oil, and maintaining the engine speed under varying loads by varying the amount of gas admitted to said cylinder to vary the richness of the gas mixture.

8. The method of operating a Diesel engine which comprises supplying the cylinder of said engine at all loads with a comparatively lean mixture of gas and air, and injecting into said cylinder a relatively small amount of oil for igniting said mixture, the compression temperature being less than the ignition temperature of said mixture and greater than the ignition temperature of said oil, the amount of oil injected being substantially constant at all loads and insufficient to operate the engine, and controlling the engine speed by varying the amount of gas in said mixture.

In testimony whereof, I have signed my name to this specification.

VICTOR HEIDELBERG.